(12) United States Patent  
Ishikawa (10) Patent No.: US 6,174,227 B1
(45) Date of Patent: Jan. 16, 2001

(54) POLISHING PAD AND POLISHING APPARATUS USING THE SAME

(75) Inventor: Akira Ishikawa, Kawasaki (JP)

(73) Assignee: Nikon Corporation, Tokyo (JP)

( * ) Notice: Under 35 U.S.C. 154(b), the term of this patent shall be extended for 0 days.

(21) Appl. No.: 09/187,910

(22) Filed: Nov. 6, 1998

(30) Foreign Application Priority Data

Nov. 7, 1997 (JP) .................................... 9-305884
Nov. 7, 1997 (JP) .................................... 9-305885

(51) Int. Cl.⁷ .................................... B24D 11/00
(52) U.S. Cl. ............................. 451/533; 451/526
(58) Field of Search ...................... 451/28, 59, 63, 451/526, 527, 533, 528, 534

(56) References Cited

FOREIGN PATENT DOCUMENTS

91-263631   5/1993 (JP) ............................... B24D/11/00

*Primary Examiner*—Derris H. Banks
(74) *Attorney, Agent, or Firm*—Chapman and Cutler

(57) ABSTRACT

A polishing pad for CMP (chemical mechanical planarization) process which contains epoxy resin (component A) and a curing agent (component B) as the major components and has a surface hardness of 2.5 to 40 in Vickers hardness. Component A is selected from the group consisting of bisphenol A epoxy resin, novolac epoxy resin, bisphenol F epoxy resin, polymers of these resins, and denatured epoxy resins. Component B is selected from the group consisting of aromatic amine, aromatic acid anhydride, imidazole, polymers of these substances, and curing agent obtained by denaturing these substances. With this arrangement, the polishing pad can have both alkali-resistant and acid-resistant properties, and is suitably used in a CMP process. Preferably, one or more kinds of inorganic or macromolecular particulates having diameters of 0.01 to 300 $\mu$m are dispersed in the major components (i.e., the epoxy resin and the curing agent). The dispersion ratio is 0.1 to 80% with respect to the total mass of the major components and the dispersed particulates. The particulates dispersed in the major components can further improve the alkali-resistant property and the acid-resistant property. In addition, by dispersing the particulates, the surface hardness of the polishing pad can be adjusted. In another aspect of the invention, in addition to components A and B, a component C is provided which is a plasticizer selected from the group consisting of monoepoxide, polyepoxide, polythiol, polyol, polycarboxyl compound, urethane polymer, and block urethane polymer. By adding the plasticizer, the surface hardness of the polishing pad can be adjusted within the range from 2.5 to 40 in Vickers hardness. The epoxy resin, the curing agent, and the plasticizer are mixed so as to satisfy the stoichiometric ratio.

16 Claims, 4 Drawing Sheets

(n: 0~15)  BISPHENOL A EPOXY RESIN

FIG. 8b (n: 0 - 2)  NOVOLAC EPOXY RESIN

FIG. 8c

BISPHENOL F EPOXY RESIN

POLISHING PAD AND POLISHING APPARATUS USING THE SAME

BACKGROUND OF THE INVENTION

1. Field of Invention

This invention relates to a polishing pad and a polishing apparatus using the polishing pad, and more particularly, to a CMP polishing pad for flattening and smoothing the surface of an insulating film or a metal film formed on a semiconductor wafer during a manufacturing process of ULSI circuits, and an apparatus using such a CMP polishing pad.

2. Description of the Related Art

As semiconductor circuits become highly integrated with more minute patterns, the number of steps required for the manufacturing process of such semiconductors has increased, each step becoming more complicated. The increased number of complicated steps often result in uneven surfaces of semiconductor devices manufactured by that process. Unevenness on the surface of a semiconductor device causes cutoff of the interconnections and local increase of the resistance, which further causes breakdown and decrease of the current capacity. The unevenness also deteriorates the durability of the insulating film, and causes undesirable leakage.

Along with the high integration of semiconductor circuits, the wavelength of a light source used in optical lithography becomes shorter, while the numerical aperture (NA) increases. This means that the focal depth of a semiconductor exposure apparatus decreases. In order to deal with the shallow focal depth, a semiconductor device must have a smoother and more uniform surface.

Figure 7A:
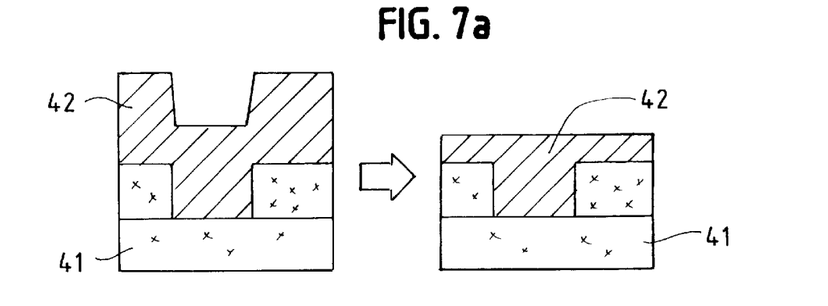
FIGS. 7(a)&(b) illustrates two examples of flattening the surfaces of semiconductor devices.
Figure 7B:
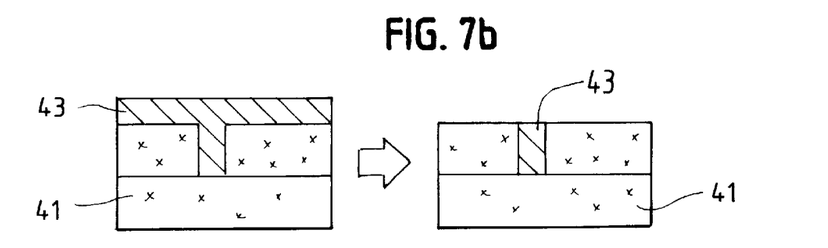

In other words, the current semiconductor manufacturing technique requires a surface smoothing technique, as shown in FIG. 7. FIG. 7 illustrates two examples of smoothing semiconductor surfaces.

In FIG. 7(a), an interlayer insulating film 42 made of $SiO_2$ is formed on a silicon wafer 41. This interlayer insulating film 42 has an uneven surface immediately after the deposition, and the uneven surface is polished into a flat and smooth surface. In FIG. 7(b), a metal layer 43 made of Al is formed on the entire surface of a silicon wafer 41. The Al metal layer 43 is polished in order to form an embedded electrode pattern of combination of the presence and the absence of the metal layer 43.

In order to flatten the semiconductor surface, a chemical mechanical polishing method or a chemical mechanical planerization method (hereinafter, referred to as a CMP method) is preferably used.

The CMP method has been developed based on a mirror polishing method for silicon wafers. The CMP is performed typically using an apparatus illustrated in FIG. 6. This CMP apparatus comprises a grinder, which consists of a surface plate 31 and a polishing pad 32 attached to the surface plate 31, and a polishing head 33 for holding a wafer 34. The wafer 34 is in contact with the polishing pad 32 which is being rotated together with the surface plate 31. At this time, the wafer 34 is reciprocated in the radial direction of the surface plate 31, while the wafer 34 itself is also being rotated, whereby the wafer surface is polished. During this operation, a load is applied on the polishing head 33 from the above.

Figure 6:
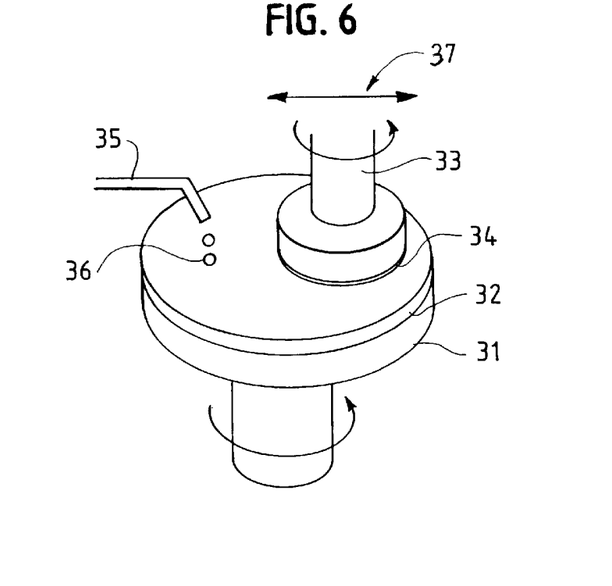
FIG. 6 is a schematic perspective view of a conventional CMP apparatus.

An abrasive 36 is supplied onto the polishing pad 32 from an abrasive supply nozzle 15. The abrasive 36 diffuses onto the polishing pad 35, and gets into the gap between the polishing pad 32 and the wafer 34 during the relative motion of these two elements, whereby the surface of the wafer 34 is polished. Thus, the mechanical motions of the polishing pad 32 and the wafer 34, and the chemical effect of the abrasive 36 mutually act on the surface of the wafer 34.

In the conventional polishing apparatus, a sheet-type polishing pad (or polisher) made of foamed polyurethane is typically used as the polishing pad 32.

However, sheet-type polishing pads made of foamed polyurethane have several problems. First, if a wafer is polished using such a sheet-type polishing pad, the edge of the wafer is apt to hang down. Second, sheet-type polishing pads are likely to deform due to the polishing pressure generated by a load on the polishing head. Third, if a sheet-type polishing pad is pasted onto the surface plate, unevenness of the adhesive prevents the polishing surface of the polishing pad from having a desired flatness. To be more precise, it is difficult for the polishing pad to achieve a profile irregularity less than $\lambda$. Fourth, a sheet-type polishing pad is easily loaded with particles of polished wafer and, therefore, a dressing operation is required to file the polishing surface of the pad.

In order to solve these problems, a polishing pad made of epoxy resin as the major component has been proposed by, for example, Japanese patent application serial No. 8-115794.

As has been described in connection with FIG. 7, two different types of layers, an interlayer insulating film (e.g., an $SiO_2$ layer) and a metal interconnection (e.g., an Al or W layer), are polished by a CMP process using different abrasives. The pH values of the abrasives greatly differ depending on which type of layer is polished. When polishing insulating films, an alkaline abrasive with a pH value of about 11 is used, while when polishing metal layers, an acid abrasive with a pH value of about 3 is used. Accordingly, the polishing pad must have both alkali-resistant and acid-resistant properties.

However, if aliphatic amine is used as a curing agent in a manufacturing process of a polishing pad made of epoxy resin as the major component, the polishing pad does not have an acid-resistant property. If fatty acid anhydride is used as a curing agent, the final product (i.e., the polishing pad) does not have an alkali-resistant property. Such a polishing pad is soluble and corrosive to the abrasive.

In addition, the hardnesses of the above-described two types of objects, namely, the SiO2 interlayer insulating film and the Al or W interconnection, are very different from each other. If the hardness of the polishing pad is smaller than that of the object to be polished, the wear of the polishing pad is greater than that of the object being polished. In this case, the correct shape and the precision of the polishing pad can not be maintained. If the polishing pad is harder than the object to be polished, then a small amount of impurity existing in the gap between the polishing pad and the object being polished easily causes scratches on the object surface. Therefore, the hardness of the polishing pad must be appropriately selected corresponding to the hardness of the object to be polished.

In response to this demand, the hardness of an epoxy resin polishing pad is adjusted by changing the mixture ratio of the epoxy resin and the curing agent, by changing the kind and the amount of the particulates dispersed in the epoxy resin and the curing agent, or by combination of these two methods.

However, if the mixture ratio of the epoxy resin and the curing agent is changed in order to adjust the hardness of the final product, the stoichiometric reaction ratio of the epoxy resin (which is the major component of the polishing pad) and the curing agent deviates from the optimum stoichiometric ratio and, as a result, the heat transition point lowers. In addition, the chemical resistance (i.e., the alkali resistance and the acid resistance) are also deteriorated by nonreacted resin.

If the hardness is adjusted by changing the kind and the amount of the particulates dispersed in the epoxy resin or the curing agent, the adjustable range is very limited. In addition, depending on the type and the amount of the particulates, uniform dispersion in the epoxy resin can not be achieved, and an undesirable distribution of hardness is caused in the polishing plane of the polishing pad.

SUMMARY OF THE INVENTION

Therefore, it is an object of the invention to overcome these prior art problems, and to provide a CMP polishing pad which is anticorrosive and insoluble to an abrasive. It is another object of the invention to provide a polishing pad having an optimal hardness corresponding to the hardness of an object to be polished. It is still another object of the invention to provide a polishing apparatus using such a polishing pad.

In order to achieve this object, in one aspect of the invention, a CMP polishing pad which contains epoxy resin (referred to as component A) and a curing agent (referred to as component B) as the major components and has a surface hardness of 2.5 to 40 in Vickers hardness is provided. Component A (epoxy resin) is selected from the group consisting of bisphenol A epoxy resin, novolac epoxy resin, bisphenol F epoxy resin, polymers of these resins, and denatured epoxy resins. Component B (curing agent) is selected from the group consisting of aromatic amine, aromatic acid anhydride, imidazole, polymers of these substances, and curing agent obtained by denaturing these substances. With this arrangement, the polishing pad can have both alkali-resistant and acid-resistant properties, and is suitably used in a CMP process.

Preferably, one or more kinds of inorganic particulates having diameters of 0.01 to 300 $\mu$m are dispersed in the major components (i.e., the epoxy resin and the curing agent). The dispersion ratio is 0.1 to 80% with respect to the total mass of the major components and the dispersed particulates. The particulates dispersed in the major components can further improve the alkali-resistant property and the acid-resistant property. In addition, by dispersing the particulates, the surface hardness of the polishing pad can be adjusted. Because the diameter of the particulates ranges from 0.01 to 300 $\mu$m, they do not scratch or damage the wafer surface during the polishing.

Alternatively, one or more kinds of macromolecular particulates having diameters of 0.01 to 300 $\mu$m may be dispersed in the major components. In this case, the dispersion ratio is again 0.1 to 80% with respect to the total mass of the major components and the dispersed particulates. The macromolecular particulates can achieve the same effect as the inorganic particulates, that is, improvement of the alkali-resistant and acid-resistant properties, adjustment of the surface hardness of the polishing pad, and no damage to the wafer surface during the polishing.

In another aspect of the invention, a polishing apparatus which has a grinder comprising a surface plate and the polishing pad described above is provided. This polishing apparatus polishes an object by moving the object and the grinder relative to each other with an abrasive between the object and the grinder.

Since the polishing pad can be made with a desired hardness, it does not deform even if a load is applied on it during the polishing. The entire wafer surface can be uniformly polished without causing the edge of the wafer to hang down, unlike the conventional foamed urethane polishing pad.

In still another aspect of the invention, a CMP polishing pad which contains components A, B, and C as the major components, and has a surface hardness of 2.5 to 40 in Vickers hardness, is provided. The component A is an epoxy resin selected from the group consisting of bisphenol A epoxy resin, novolac epoxy resin, bisphenol F epoxy resin, polymers of these resins, and denatured epoxy resins. The component B is a curing agent selected from the group consisting of aromatic amine, aromatic acid anhydride, imidazole, polymers of these substances, and curing agent obtained by denaturing these substances. The component C is a plasticizer selected from the group consisting of monoepoxide, polyepoxide, polythiol, polyol, polycarboxyl compound, urethane polymer, and block urethane polymer.

By adding the plasticizer, the surface hardness of the polishing pad can be adjusted within the range from 2.5 to 40 in Vickers hardness. The epoxy resin, the curing agent, and the plasticizer are mixed so as to satisfy the stoichiometric ratio. Accordingly, no nonreacted resin remains in the final product, which is superior in chemical resistance (alkali resistance and acid resistance).

The curing agent is selected from aromatic amine, aromatic acid anhydride, imidazole, polymers of these substances, or denatured material from these substances. These substances contribute to the alkali-resistant and acid-resistant properties of the final product.

Preferably, one or more kinds of inorganic particulates having diameters of 0.01 to 300 $\mu$m are dispersed in the major components (i.e., the epoxy resin and the curing agent). The dispersion ratio is 0.1 to 80% with respect to the total mass of the major components and the dispersed particulates. The particulates dispersed in the major components can further improve the alkali-resistant property and the acid-resistant property, as well as the degree of freedom for adjusting the surface hardness of the polishing pad. The range of the particulate diameter (0.01 to 300 $\mu$m) does not cause scratch or damage to the wafer surface during the polishing.

Alternatively, one or more kinds of macromolecular particulates having diameters of 0.01 to 300 $\mu$m may be dispersed in the major components with the dispersion ratio of 0.1 to 80% with respect to the total mass of the major components and the dispersed particulates. The macromolecular particulates can also improve the alkali-resistant and acid-resistant properties, and adjustability of the surface hardness, without causing damage to the wafer surface during the polishing.

In another aspect of the invention, a polishing apparatus which has a grinder comprising a surface plate and the polishing pad described above is provided. This polishing apparatus polishes an object by moving the object and the grinder relative to each other with an abrasive between the object and the grinder.

The polishing pad of this apparatus has a desired hardness corresponding to the hardness of an object to be polished. The profile irregularities of both the polishing pad and the object being polished are kept minimum. Thus, the entire wafer surface can be uniformly polished without causing undesirable damages to the surface of the object being polished.

BRIEF DESCRIPTION OF THE DRAWINGS

The above and other objects, features, and advantages of the invention will be apparent from the following detailed description with reference to the attached drawings, wherein:

FIGS. 3(a)&(b) illustrate the step of making the top surface of the polishing pad flat and even according to the first embodiment;

DETAILED DESCRIPTION OF THE PREFERRED EMBODIMENTS

Figure 1:
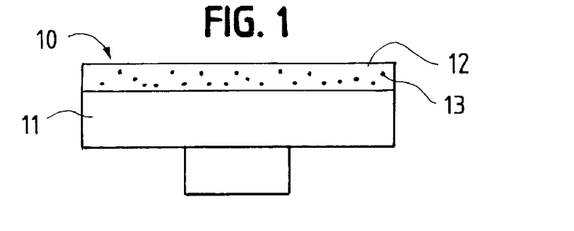
FIG. 1 is a cross-sectional view of a grinder comprising a polishing pad and a surface plate according to the first embodiment of the invention.

FIG. 1 illustrates a grinder 10 which comprises a surface plate 11 and a polishing pad 12 formed on the surface plate 11 according to the first embodiment.

The major component of the polishing pad 12 is epoxy resin. The polishing pad 12 is formed directly on the surface plate 11 making use of inherent adherence of the epoxy resin.

Thus, no adhesive is required to attach the polishing pad 12 onto the surface plate 11, unlike the conventional process. Accordingly, unevenness or irregularity on the pad surface due to the adhesive layer, which is one of the problems in the prior art method, can be eliminated.

The epoxy resin used for the polishing pad is selected from bisphenol A epoxy resin, novolac epoxy resin, bisphenol F epoxy resin, polymers of these resins, or denatured epoxy resins.

Figure 8A:
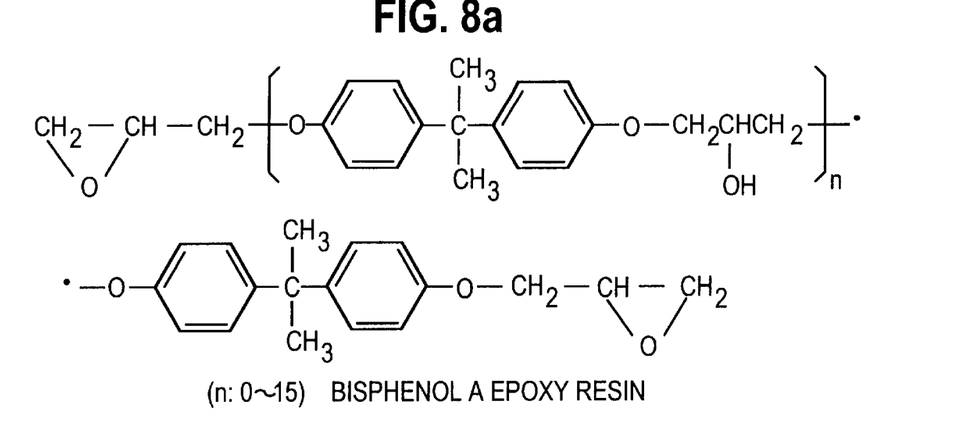
FIGS. 8(a)–(c) represent chemical formulas of (a) bisphenol A epoxy resin, (b) novolac epoxy resin, and (c) bisphenol F epoxy resin.
Figure 8B:
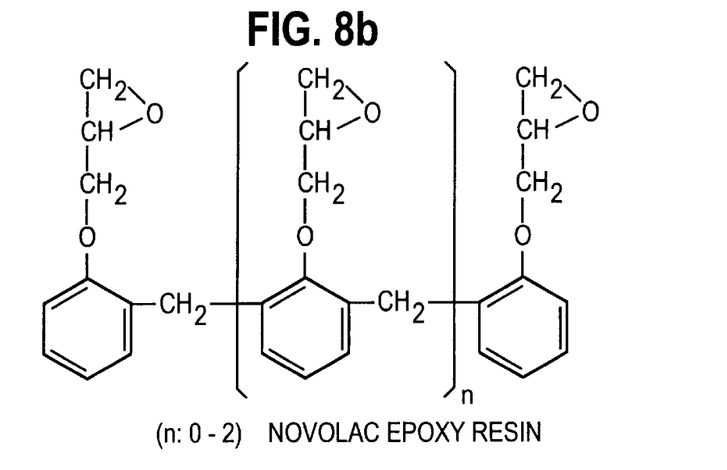
Figure 8C:
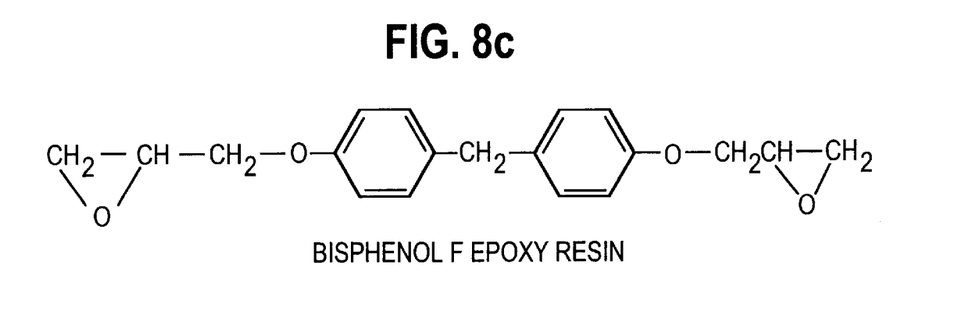

The bisphenol A epoxy resin is represented by chemical formula 1, novolac epoxy resin is represented by formula 2, and bisphenol F epoxy resin is represented by formula 3.

A curing agent is mixed into the epoxy resin. The curing agent is selected from aromatic amine, aromatic acid anhydride, imidazole, polymers of these substances, or denatured material from these substances. The amount of the curing agent added is 0.7 to 1.2 of the stoichiometric amount.

All of the above listed epoxy resins and the curing agents have benzene rings, which can improve the alkali-resistant and acid-resistant properties of the final product.

The examples of aromatic amine include, but are not limited to, m-phenylenediamine, o-phenylenediamine, p-phenylenediamine, 2, 4-diaminoanizole, 2, 4-toluendiamine, 2, 4-diaminodiphenylamine, 4, 4'-methylenedianiline, 4, 4'-diaminodiphenylsulfone, diaminodixylylsulfone, m-xylenediamine, and 1, 3-diaminocyclohexene.

The examples of aromatic acid anhydride include, but are not limited to, phthalic anhydride, trimellitic anhydride, pyromellitic anhydride, 3, 3', 4, 4'-benzonphenone tetracarboxylic anhydride, ethylene glycol bisanhydrotrimellitate, and glycerol trisanhydrotrimellitate.

The examples of imidazole include, but are not limited to 2-methylimidazole, 2-ethyl-4-methylimidazole, 2-undecylimidazole, 2-heptadecylimidazole, 2-phenylimidazole, 1-benzyl-methylimidazole, 1-cyanoethyl-methylimidazole, 1-cyanoethyl-2-ethyl-4-methylimidazole, 1-cyanoethyl-2-undecylimidazole, 1-cyanoethyl-2-undecylimidazolium trimellitate, 1-cyanoethyl-2-phenylimidazoium trimellitate, 2-methylimidazolium isocyanurate, 2-phenylimidazoium isocyanurate, 2, 4-diamino-6-[2-methylimidazolyl-(1)]-ethylS-triazine, 2, 4-diamino-6-[2-ethyl-4-methylimidazolyl-(1)]-ethylS-triazine, 2, 4-diamino-6-[2-undecylimidazolyl-(1)]-ethylS-triazine, 2-phenyl-4, 5-dihydroxymethylimidazole, 2-phenyl-4-methyl-5-hydroxymethylimidazole, 1-cyanoethyl-2-phenyl-4, 5-di (cyanoethoxymethylimidazole), 1-dodecyl-2-methyl-3-benzylimidazoium chloride, and 1, 3-dibenzyl-2-methylimidazoium chloride.

Preferably, inorganic or macromolecular particulates, the diameters of which are 0.01 to 300 μm, are mixed in the epoxy resin and the curing agent. This can further improve the alkali-resistant and acid-resistant properties.

The examples of inorganic particulates dispersed in the epoxy resin and the curing agent include, but are not limited to, particles of asbestos, carbon, silicon oxide, cerium oxide, aluminum oxide, titanium oxide, zirconium oxide, magnesium oxide, silicon carbonate, and boron nitride.

The examples of macromolecular particulates include, but are not limited to, beads or powder of acrylic resin, polyethylene resin, urethane resin, fluorine resin, silicon resin, polyamide resin, polystyrene resin, and polyisopropylene. Carbon fiber or glass fiber may also be dispersed in the epoxy resin and the curing agent.

The ratio of the particulates dispersed in the epoxy resin and the curing agent is 0.1 to 80% of the total mass of the epoxy resin, the curing agent, and the particulates. Within this range, the optimal ratio is selected so that the surface hardness of the polishing pad becomes 2.5 to 40 in Vickers hardness taking into account the hardness of a wafer to be polished.

A number of effects can be achieved by mixing the particulates into the epoxy resin and the curing agent. For example, the mechanical strength of the polishing pad increases, the thermal distortion temperature becomes higher, and the frictional heat generated during polishing a wafer is reduced. Especially, reduction of the frictional heat (i.e., the frictional resistance) is conspicuous, and the sliding of the polishing pad on the wafer surface is improved.

In the second embodiment of the invention, a polishing pad is made of epoxy resin, which is the major component of the polishing pad, as in the first embodiment. A curing agent and a plasticizer (hereinafter, referred to as a mixture) are added to the epoxy resin. The amount of curing agent added is 0.7 to 1.2 of the stoichiometric amount. The plasticizer can efficiently adjust the hardness of the polishing pad.

Inorganic or macromolecular particulates may be mixed into the epoxy resin. Preferable examples of the epoxy resin, the curing agent, the inorganic or macromolecular particulates are the same as those described in the first embodiment.

The plasticizer is selected from monoepoxide, polyepoxide, polythiol, polyol, polycarboxyl compound, urethane polymer, and block urethane polymer.

Monoepoxide can be, for example, an epoxy compound of cardanole.

The examples of polyepoxide include, but are not limited to, epoxy compound of polypropylene glycol of polyglycyzyl ether group, epoxy compound of polyol containing a benzene ring which is obtained by adding propylene oxide to bisphenol A, partial adduct of bisphenol A-type liquid epoxy resin and polymerized fatty acid, and polyglycyzyl ester which is polymerized fatty acid of polyglycyzyl ester group.

Polyol is, for example, polypropylene glycol, polytetramethylene glycol, and polyester having an OH-end group.

The amount of the plasticizer added is 0.1 to 80% of the total mass of the epoxy resin and the plasticizer. Within this range, the optimal ratio is selected so that the surface hardness of the polishing pad becomes 2.5 to 40 in Vickers hardness taking into account the hardness of a wafer to be polished.

Next, a manufacturing process of the polishing pad according to the invention will be described.

Figure 2A:
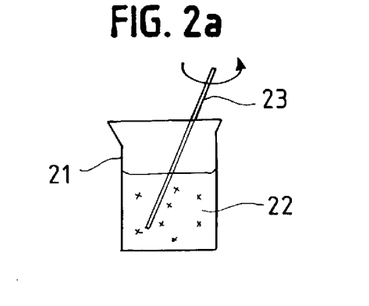
FIGS. 2(a)–(d) illustrate the manufacturing process of the polishing pad according to the first embodiment.
Figure 2B:
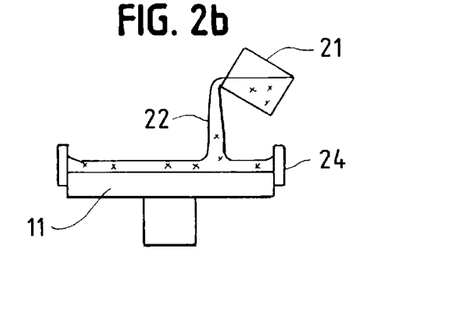
Figure 2C:
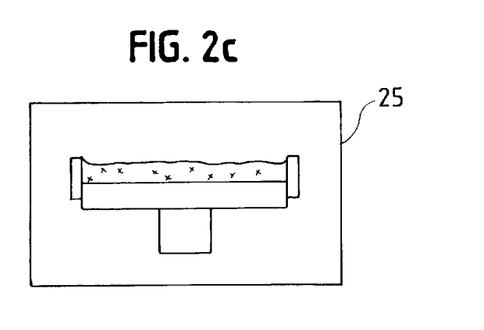
Figure 2D:
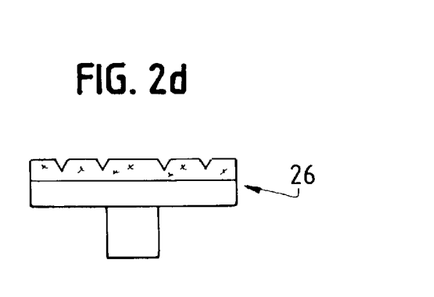
Figures 3A, 3B:
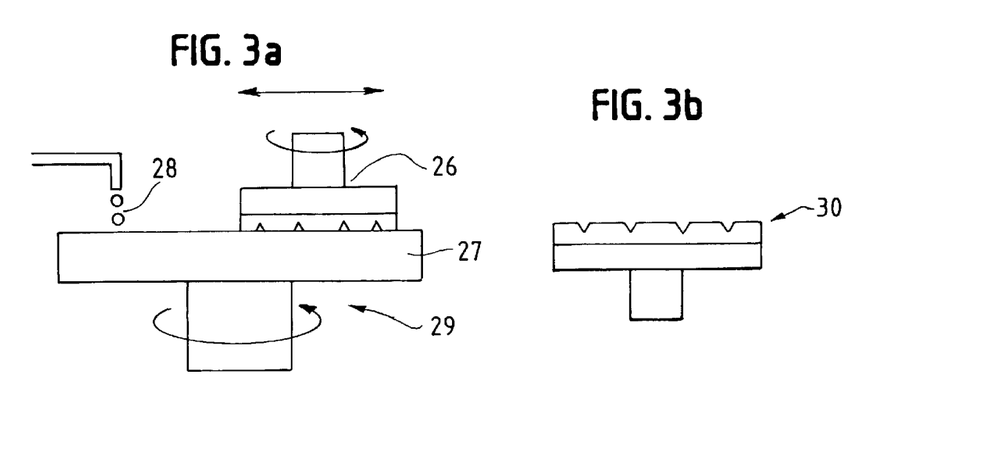

FIGS. 2 and 3 illustrate the manufacturing process of the polishing pad described in the first embodiment.

First, epoxy resin and a curing agent described above (hereinafter, comprehensively referred to as epoxy resin mixture 22) are mixed in a container 21 at a predetermined weight ratio, and adequately stirred by a stirring stick 23, as shown in FIG. 2(a).

This epoxy resin mixture 22 is dropped onto a disc-type surface plate 11 having a diameter of φ300 mm to 1000 mm and placed in a pad manufacturing frame 24 until the thickness of the epoxy resin layer reaches 2 to 10 mm (FIG. 2(b)). The surface plate 11 is made of, for example, cast iron or molten quartz.

The frame 24 and the surface plate 11, on which the epoxy resin layer is formed, are placed in an isothermal treatment tank 25, and heated at 120° C. to 200° C. for 5 to 12 hours in order to sufficiently cure the resin (FIG. 2c).

After the temperature has adequately lowered, the surface plate 11 and the frame 24 are taken out of the tank 25. Then, grooves for allowing an abrasive to flow are formed on the surface of the cured epoxy resin layer by machining, and the epoxy resin layer (or the polishing pad) is roughly ground, whereby the grinder 26 is obtained. (FIG. 2d).

Next, the surface of the polishing pad of the grinder 26 is evened more precisely using an Oscar-type polishing machine 29 having a laminated disc plate 27 of a diameter of φ300 mm to 1200 mm, while supplying a cerium oxide abrasive 28 of 5% by weight, until the surface irregularity becomes less than 1 μm. Thus, a grinder 30 is completed (FIGS. 3a and 3b).

The polishing pad of the second embodiment is also manufactured by the same manufacturing process, except that epoxy resin, a plasticizer, and a curing agent (comprehensively referred to as a mixture 22) are mixed in a container 21 at a predetermined weight ratio. (See FIGS. 2(a) through 2(d) and FIGS. 3(a) and 3(b).)

[ACTUAL EXAMPLES]

Example 1

Bisphenol-A epoxy resin (sold under the trade name of EPICOAT 828 by Yuka Shell Co., Ltd..) and diaminodiphenylmethane (aromatic amine) were mixed in a container 26 at a weight ratio of 100:26, and the mixture was adequately stirred by a stirring stick.

This mixture was dropped on a polyethylene frame having dimensions of φ36X30t. The frame including the mixture was inserted in an isothermal treatment tank, and heated at 120° C. for 5 hours in order to sufficiently cure the resin.

After the temperature inside the treatment tank had adequately lowered, the frame was taken out of the tank, and the cured resin was machined into a disc having dimensions of φ30X2t. Three samples 1–3 were prepared in this manner for estimating the chemical-resistant property.

The chemical-resistant properties of the samples were estimated by the following steps.

The samples 1, 2 and 3 were immersed in pure water, KOH solution of pH12, and $HCl/H_2O_2$ mixed solution of pH2, respectively, at 60° C. for 5 hours. The weights of these samples before and after the immersion were measure in order to check any weight changes.

The measurement result is shown in Table 1. From the data, it can be confirmed that the samples 1, 2, and 3 have both alkali-resistant and acid-resistant properties. The Vickers hardness of the samples 1, 2 and 3 was about 18.

Example 2

The bisphenol-A epoxy resin (sold under the trade name of EPICOAT 828 by Yuka Shell Co., Ltd..) and trimellitic anhydride (aromatic acid anhydride) were mixed at a weight ratio of 100:33, and the mixture was heated at 200° C. for 5 hours in order to cure the resin. Samples 4, 5 and 6 were prepared by the same procedure as in Example 1.

The chemical-resistant properties of the samples 4, 5 and 6 were estimated by the same method as in Example 1.

The measurement result is shown in Table 1. As is clear from the data, the samples 4, 5, and 6 have both alkali-resistant and acid-resistant properties. The Vickers hardness of the samples 4, 5 and 6 is about 25.

Example 3

The bisphenol-A epoxy resin (sold under the trade name of EPICOAT 828 by Yuka Shell Co., Ltd..), diaminodiphenylmethane (aromatic amine), and SiO2 particulates having a diameter of 1 μm were mixed at a weight ratio of 100:26:6.6, and the mixture was heated at 120° C. for 5 hours in order to cure the resin. Samples 7, 8 and 9 were prepared by the same procedure as in Example 1.

The chemical-resistant properties of the samples 7, 8 and 9 were estimated by the same method as in Example 1.

The measurement result is shown in Table 1. By adding the particulates, both the alkali-resistant and acid-resistant properties of the samples are improved, as compared with Example 1. The Vickers hardness of the samples 7, 8 and 9 was about 22.

Example 4

Bisphenol-A epoxy resin (sold under the trade name of EPICOAT 828 by Yuka Shell Co., Ltd..), diaminodiphenylmethane (aromatic amine), and polystyrene particulates having a diameter of 1 μm were mixed at a weight ratio of 100:26:6.6, and the mixture was heated at 120° C. for 5 hours in order to cure the resin. Samples 11, 12 and 13 were prepared by the same procedure as in Example 1.

The chemical-resistant properties of the samples 11, 12 and 13 were estimated by the same method as in Example 1.

The measurement result is shown in Table 1. By addition of the particulates, both the alkali-resistant and acid-resistant properties of the samples are improved, as compared with Example 1. The Vickers hardness of the samples 11, 12 and 13 was about 16.

Comparison Example 1

Bisphenol-A epoxy resin (sold under the trade name of EPICOAT 828 by Yuka Shell Co., Ltd..) and tetraethylenepentamine (aliphatic amine) were mixed at a weight ratio of 10:7, and the mixture was heated at 80° C. for 8 hours in order to cure the resin. Samples 14, 15 and 16 were prepared by the same procedure as in Example 1.

The chemical-resistant properties of the samples 14, 15 and 16 were estimated by the same method as in Example 1.

The measurement result is shown in Table 1. As is clear from the data, the samples 14, 15, and 16 are inferior in its alkali-resistant property, and erosion occurred when they were immersed in $HCl/H_2O_2$ mixed solution of pH2.

TABLE 1

WEIGHT CHANGE CAUSED BY CHEMICAL RESISTANCE TEST [%]

|  | Pure Water | KOH | $HCl/H_2O_2$ |
|---|---|---|---|
| EXAMPLE 1 | 0.43 | 0.42 | 0.45 |
| EXAMPLE 2 | 0.20 | 0.19 | 0.33 |
| EXAMPLE 3 | 0.37 | 0.36 | 0.38 |
| EXAMPLE 4 | 0.35 | 0.39 | 0.40 |
| COMPARISON EXAMPLE 1 | 1.2 | 2.5 | Eroded |

Example 5

A polishing pad according to the invention was manufactured following the steps shown in FIGS. 2 and 3.

Bisphenol-A epoxy resin (sold under the trade name of EPICOAT 828 by Yuka Shell Co., Ltd..), diaminodiphenylmethane, and graphite particulates having a diameter of 1 $\mu$ were mixed in a container 21 at a weight ratio of 100:26:6.6, and adequately stirred by a stirring stick 23, as shown in FIG. 2a. This mixture is referred to as epoxy resin 22.

This epoxy resin 22 was dropped onto a disc-type surface plate 11 having a diameter of $\phi$300 mm and placed in a pad manufacturing frame 24 until the thickness of the epoxy resin layer reached 5 mm (FIG. 2b).

The frame 24 and the surface plate 11, on which the epoxy resin 22 was deposited, were put in an isothermal treatment tank 25, and heated at 120° C. for 5 hours in order to sufficiently cure the resin (FIG. 2c).

After the temperature has adequately lowered, the surface plate 11 and the frame 24 were taken out of the tank 25. Then, grooves for allowing an abrasive to flow are formed on the surface of the cured epoxy resin layer by machining, and the epoxy resin layer (or the polishing pad) is roughly ground, whereby the grinder 26 was obtained. (FIG. 2d) The Vickers hardness of this polishing pad was about 20.

Then, the surface of the polishing pad of the grinder 26 was evened more precisely using an Oscar-type polishing machine 29 having a laminated disc plate 27 of a diameter of $\phi$300 mm, while supplying a cerium oxide abrasive 28 of 5% by weight, until the surface irregularity becomes less than 1 $\mu$m. Thus, a grinder 30 was completed (FIGS. 3a and 3b).

This grinder 30 was used in a polishing apparatus in place of a conventional polishing pad and a surface plate in order to even and polish a semiconductor surface.

The wafer used is a silicon wafer having a diameter of 3 inches, on which an aluminum pattern with a thickness of 1 $\mu$m is formed. A silicon oxide (SiO2) is formed over the aluminum pattern layer by plasma CVD, so that this sample wafer has an uneven surface as shown in FIG. 7a. The top surface of this sample wafer was polished under the following conditions:

revolution rate of wafer: 20–100 rpm revolution rate of polishing head: 20–100 rpm reciprocation width of wafer: 35 mm reciprocation rate of wafer: 5 round trip/min load: 50–400 g/cm2 abrasive: SiO2 alkaline solution polishing time: 2 minutes

Two hundred (200) wafers prepared by the same manner were polished under the same conditions. The surface flatness was measured based on Newton's fringes. For all the wafers, the polished surfaces were satisfactorily flat within the range of two to four Newton's fringes. Surface irregularity due to variations in the pattern density or hang-down of the edge were not observed. The surface condition of the polishing pad was also evaluated after the two hundred wafers were polished. The initial condition of the polishing pad was well kept even after polishing two hundred wafers.

Example 6

Bisphenol-A epoxy resin (sold under the trade name of EPICOAT 828 by Yuka Shell Co., Ltd..), and polymerized fatty acid glycyzylester (sold under the trade name of EPICOAT 781 by Yuka Shell Co., Ltd..), which functions as a plasticizer, were mixed at different ratios such that the ratios of the polymerized fatty acid glycyzylester to the total weight of the bisphenol-A epoxy resin and the polymerized fatty acid glycyzylester were 0%, 10%, 20%, 40% and 60%. These different mixtures were adequately stirred by a stirring stick in separate containers.

Then, diaminophenylmethane (aromatic amine) equivalent to the epoxy equivalent of the mixture was added to each mixture, and further stirred by the stirring stick.

The new mixtures were deposited in polyethylene containers of $\phi$36X30t.

The mixtures and the containers were placed in an isothermal treatment tank, and heated at 120° C. for 5 hours in order to cure the resin.

After the temperature had adequately lowered, these containers were taken out of the tank, and each cured resin was machined into a disc of $\phi$30X2t. Then, the surface of each disc was polished by a #400 water-proof sandpaper, a #600 water-proof sandpaper, and a 5 $\mu$m aluminum polisher, whereby sample pads having glossy surfaces were prepared for hardness check.

Figure 4:
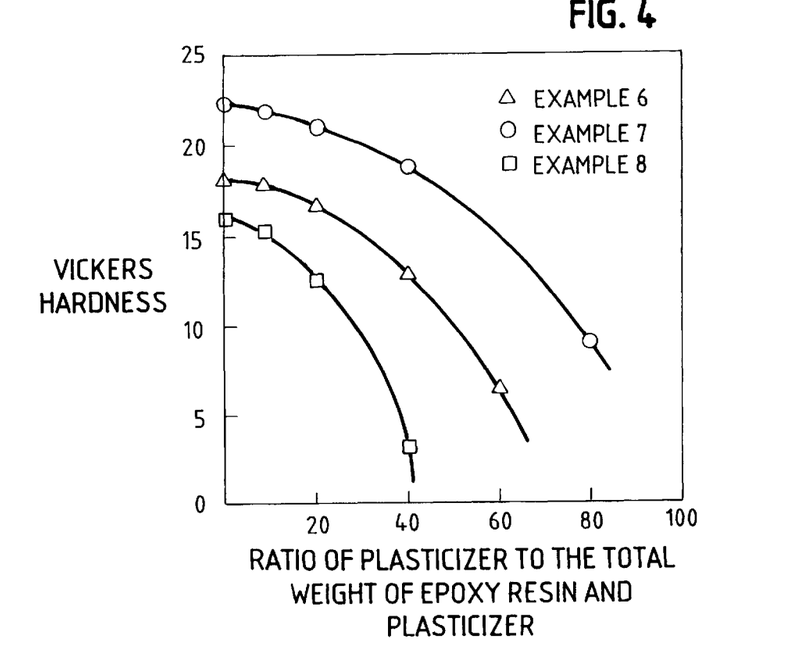
FIG. 4 is a diagram showing the relationship between the surface hardness and the ratio of the plasticizer added in Examples 6, 7 and 8.

The Vickers hardness of these samples were shown in FIG. 4.

These samples were also subjected to a chemical-resistance test. Because any of the mixture ratios of bisphenol-A epoxy resin, polymerized fatty acid polyglycyzylester, and diaminodiphenylmethane described above satisfy the stoichiometric ratio, no nonreacted resin were left, and all samples exhibited superior chemical-resistant properties.

Example 7

Bisphenol-A epoxy resin (sold under the trade name of EPICOAT 828 by Yuka Shell Co., Ltd..) and polymerized fatty acid glycyzylester (sold under the trade name of EPICOAT 781 by Yuka Shell Co., Ltd..), which functions as a plasticizer, were mixed at different ratios such that the ratios of the polymerized fatty acid glycyzylester to the total weight of the bisphenol-A epoxy resin and the polymerized fatty acid glycyzylester were 0%, 10%, 20%, 40% and 80%. These different mixtures were adequately stirred by a stirring stick in separate containers.

Diaminophenylmethane (aromatic amine) equivalent to the epoxy equivalent of the mixture was added to each mixture, and further stirred by the stirring stick.

Then, SiO2 particulates having a diameter of 1 $\mu$m were mixed in each resin mixture so that the dispersed amount of the SiO2 particulates was 5% by weight of the total weight of the resin mixture and the particulates. The new mixture was also adequately stirred by the stirring stick.

Sample pads for hardness test were prepared using these resin mixtures by the same process as in Example 6. The Vickers hardness of the samples were shown in FIG. 4.

Chemical-resistance test was also conducted using the samples. Because any of the mixture ratios of bisphenol-A epoxy resin, polymerized fatty acid polyglycyzylester, and diaminodiphenylmethane described above satisfy the stoichiometric ratio, no nonreacted resin were left, and all samples exhibited superior chemical-resistant properties.

Example 8

Bisphenol-A epoxy resin (sold under the trade name of EPICOAT 828 by Yuka Shell Co., Ltd..) and polymerized fatty acid glycyzylester (sold under the trade name of EPICOAT 781 by Yuka Shell Co., Ltd..), which functions as a plasticizer, were mixed at different ratios such that the ratios of the polymerized fatty acid glycyzylester to the total weight of the bisphenol-A epoxy resin and the polymerized fatty acid glycyzylester were 0%, 10%, 20%, and 40%. These different mixtures were adequately stirred by a stirring stick in separate containers.

Diaminophenylmethane (aromatic amine) equivalent to the epoxy equivalent of the mixture was added to each mixture, and further stirred by the stirring stick.

Then, polystyrene beads having a diameter of 1 $\mu$m were mixed into each resin mixture so that the dispersed amount of the polystyrene beads became 5% by weight of the total weight of the resin mixture and the beads. The new mixture was also adequately stirred by the stirring stick.

Sample pads for hardness test were prepared using these resin mixtures by the same process as in Example 6. The Vickers hardness of the samples are shown in FIG. 4.

Chemical-resistance test was also conducted using the samples. Because any of the mixture ratios of bisphenol-A epoxy resin, polymerized fatty acid polyglycyzylester, and diaminodiphenylmethane described above satisfy the stoichiometric ratio, no nonreacted resin were left, and all samples exhibited superior chemical-resistant properties.

Comparison Example 2

Bisphenol-A epoxy resin (sold under the trade name of EPICOAT 828 by Yuka Shell Co., Ltd..) and diaminophenylmethane (aromatic amine) were mixed in a container at a ratio of 100:26. Then, the mixture was divided into separate containers, and polystyrene beads having a diameter of 1 $\mu$m were mixed into each container so that the ratios of the polystyrene beads were 0%, 10% and 20% by weight to the total weight of the resin mixture and the beads.

It would be difficult to mix the polystyrene beads exceeding 25% of the total weight because the viscosity of the mixture greatly increase.

Figure 5:
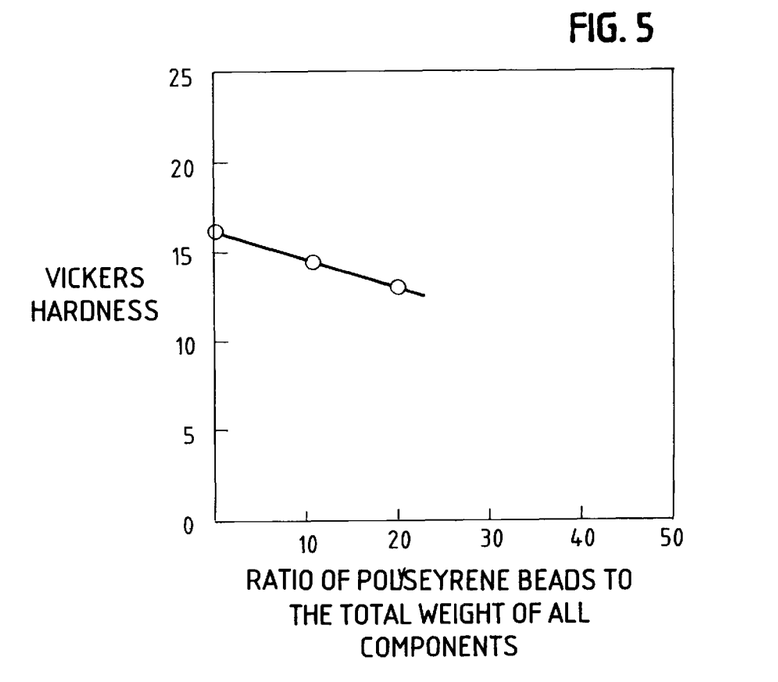
FIG. 5 is a diagram showing the relation between the surface hardness and the ratio of the particulates dispersed in Comparison Example 2.

Sample pads for the hardness test were prepared using these resin mixtures by the same process as in Example 6. The Vickers hardness of the samples were shown in FIG. 5. Comparing this result with FIG. 4, it is confirmed that the Vickers hardness controllable range of this Comparison Example 2 is narrower than the hardness controllable ranges of the samples containing a plasticizer as a component.

Example 9

A polishing pad according to the invention was manufactured following the steps shown in FIGS. 2 and 3.

Bisphenol-A epoxy resin (sold under the trade name of EPICOAT 828 by Yuka Shell Co., Ltd.), polymerized fatty acid polyglycyzylester (sold under the trade name of EPICOAT 781 by Yuka Shell Co., Ltd.), and diaminodiphenylmethane were mixed in a container 21 at a weight ratio of 100:32:100 (referred to as a mixture), and adequately stirred by a stirring stick 23, as shown in FIG. 2(a).

The subsequent steps for manufacturing a grinder with a polishing pad are the same as those in Example 5 and shown in FIGS. 2(b) through 2(d) and FIGS. 3(a) and 3(b).

The grinder 30 manufactured in Example 9 was used in a polishing apparatus in place of a conventional polishing pad and a surface plate in order to even and polish a semiconductor surface.

The wafer used is a silicon wafer having a diameter of 3 inches, on which an aluminum pattern with a thickness of 1 $\mu$m is formed. A silicon oxide (SiO2) is formed over the aluminum pattern layer by plasma CVD, so that this sample wafer has an uneven surface as shown in FIG. 7(a). The top surface of this sample wafer was polished under the same conditions as in Example 5.

Two hundred (200) wafers prepared in this Example were polished under the same conditions, and the surface flatness was observed based on Newton's fringes. For all the wafers, the polished surfaces were satisfactorily flat within the range of two to four Newton's fringes. No scratches due to the polishing were found on the wafer surfaces. In addition, surface irregularity due to variations in the pattern density or hang-down of the edge were not observed. The surface condition of the polishing pad was also evaluated after the two hundred wafers were polished. The initial condition of the polishing pad was well kept even after polishing two hundred wafers.

Comparison Example 3

Bisphenol-A epoxy resin (sold under the trade name of EPICOAT 828 by Yuka Shell Co., Ltd..) and diaminophenylmethane (aromatic amine) were mixed in a container at a ratio of 100:26. Then, polystyrene beads having a diameter of 1 $\mu$m were mixed into the container so that the ratio of the polystyrene beads was 5% by weight to the total weight of the resin mixture.

Two hundred wafers were polished under the same conditions as in Example 9. The flatness of the wafers after being polished was satisfactory within a range of two to four Newton's fringes; however, scratches were observed on the wafer surfaces.

As has been described, the polishing pad according to the present invention is superior in both the alkali-resistant and acid-resistant properties, and can be suitably and effectively used in a CMP process.

Because the major component of the polishing pad is epoxy resin, the polishing pad can be formed directly on a surface plate making use of the adherent of the epoxy resin itself, which allows the polishing pad to have a desired flatness of the polishing pad at a high precision through machining. This is an advantage over the prior art, in which the adhesive between the polishing pad and the surface plate prevents a desired flatness from being obtained.

As another feature of the invention, a plasticizer, such as monoepoxide, polyepoxide, polythiol, polyol, polycarboxyl compound, urethane polymer, or block urethane polymer, is added to the resin mixture, which allows the surface hardness of the polishing pad to be adjusted in a wide range (that is, from 2.5 to 40 in Vickers hardness). The epoxy resin, the curing agent, and the plasticizer were mixed so as to satisfy the stoichiometric ration for reaction. Therefore, no non-reacted resin is left, and the resultant polishing pad has excellent chemical-resistant properties (i.e., alkali-resistant and acid resistant properties). This polishing pad is especially suitable to a CMP process.

By adding particulates in the resin mixture, the alkali-resistant and acid resistant properties are further improved. This arrangement can also improve the sliding of the polishing pad on the wafer surface, while the frictional heat generated during polishing wafer surfaces is reduced.

What is claimed is:

1. A polishing pad with a surface having Vickers hardness of 2.5 to 40, comprising following major components:
    A) epoxy resin selected from a group consisting of bisphenol A epoxy resin, novolac epoxy resin, bisphenol F epoxy resin, polymers of these resins, and denatured epoxy resins; and
    B) a curing agent selected from a group consisting of aromatic amine, aromatic acid anhydride, imidazole, polymers of these substances, and product obtained by denaturing these substances.

2. The polishing pad according to claim 1, further comprising one or more kinds of particulates having diameters of 0.01 to 300 µm which are dispersed within said major components with a dispersion ratio of 0.1 to 80% with respect to the total mass of said major components and said particulates.

3. The polishing pad according to claim 2, wherein said particulates are inorganic particulates.

4. The polishing pad according to claim 2, wherein said particulates are macromolecular particulates.

5. The polishing pad according to claim 1, further comprising a plasticizer selected from a group consisting of monoepoxide, polyepoxide, polythiol, polyol, polycarboxyl compound, urethane polymer, and block urethane polymer.

6. The polishing pad according to claim 5, further comprising one or more kinds of particulates having diameters of 0.01 to 300 µm dispersed within said major components with a dispersion ratio of 0.1 to 80% with respect to the total mass of said major components and said particulates.

7. The polishing pad according to claim 6, wherein said particulates are inorganic particulates.

8. The polishing pad according to claim 6, wherein said particulates are macromolecular particulates.

9. A polishing apparatus having a grinder comprising:
    a surface plate for supporting an object to be polished; and
    a polishing pad having Vickers hardness of 2.5 to 40, said pad comprising as major components an epoxy resin and a curing agent,
wherein said epoxy resin is selected from a group consisting of bisphenol A epoxy resin, novolac epoxy resin, bisphenol F epoxy resin, polymers of these resins, and denatured epoxy resins, and the curing agent is selected from a group consisting of aromatic amine, aromatic acid anhydride, imidazole, polymers of these substances, and product obtained by denaturing said substances.

10. The polishing apparatus according to claim 9, wherein the polishing pad further comprising a number of particulates having diameters of 0.01 to 300 µm dispersed within said major components with a dispersion ratio of 0.1 to 80% with respect to the total mass of said major components and said particulates.

11. The polishing apparatus according to claim 10, wherein the said particulates are inorganic particulates.

12. The polishing apparatus according to claim 10, wherein the said particulates are macromolecular particulates.

13. A polishing apparatus having a grinder comprising:
    a surface plate for supporting an object to be polished; and
    a polishing pad having Vickers hardness of 2.5 to 40, said pad comprising as major components an epoxy resin, a curing agent and a plasticizer, wherein the epoxy resin is selected from a group consisting of bisphenol A epoxy resin, novolac epoxy resin, bisphenol F epoxy resin, polymers of these resins, and denatured epoxy resins, the curing agent is selected from a group consisting of aromatic amine, aromatic acid anhydride, imidazole, polymers of these substances and product obtained by denaturing said substances, and the plasticizer is selected from a group consisting of monoepoxide, polyepoxide, polythiol, polyol, polycarboxyl compound, urethane polymer, and block urethane polymer.

14. The polishing apparatus according to claim 13, wherein the polishing pad further comprising a number of particulates having diameters of 0.01 to 300 µm dispersed within said major components with a dispersion ratio of 0.1 to 80% with respect to the total mass of said major components and said particulates.

15. The polishing apparatus according to claim 14, wherein the said particulates are inorganic particulates.

16. The polishing apparatus according to claim 14, wherein the said particulates are macromolecular particulates.

* * * * *